(12) United States Patent
Lee

(10) Patent No.: US 8,713,171 B2
(45) Date of Patent: Apr. 29, 2014

(54) COMPUTER SERVER CAPABLE OF SUPPORTING CPU VIRTUALIZATION

(75) Inventor: Bum Sik Lee, Seongnam-si (KR)

(73) Assignee: Teemstone, Seoul (KR)

( * ) Notice: Subject to any disclaimer, the term of this patent is extended or adjusted under 35 U.S.C. 154(b) by 216 days.

(21) Appl. No.: 13/379,440

(22) PCT Filed: Oct. 28, 2010

(86) PCT No.: PCT/KR2010/007455
§ 371 (c)(1),
(2), (4) Date: Dec. 20, 2011

(87) PCT Pub. No.: WO2011/053002
PCT Pub. Date: May 5, 2011

(65) Prior Publication Data
US 2012/0254410 A1    Oct. 4, 2012

(30) Foreign Application Priority Data
Oct. 29, 2009    (KR) .................. 10-2009-0103501

(51) Int. Cl.
*G06F 15/173*    (2006.01)
(52) U.S. Cl.
USPC ......................................... 709/224; 709/226

(58) Field of Classification Search
USPC .................................................. 709/224, 226
See application file for complete search history.

(56) References Cited

U.S. PATENT DOCUMENTS

| | | | |
|---|---|---|---|
| 2005/0138165 A1* | 6/2005 | Tang et al. | 709/224 |
| 2008/0077366 A1* | 3/2008 | Neuse et al. | 703/2 |
| 2008/0263561 A1* | 10/2008 | Tagashira | 718/104 |
| 2009/0172142 A1* | 7/2009 | Hanai et al. | 709/223 |
| 2009/0300317 A1* | 12/2009 | Hepkin et al. | 711/173 |
| 2010/0223616 A1* | 9/2010 | De et al. | 718/100 |

* cited by examiner

*Primary Examiner* — Phuoc Nguyen
*Assistant Examiner* — Clarence John
(74) *Attorney, Agent, or Firm* — Sherr & Jiang, PLLC

(57) ABSTRACT

A computer server including a CPU (Central Processing Unit) pool including a plurality of CPUs, at least two partitions being exclusively offered the plurality of CPUs and independently performing an operation system, and a resource managing and monitoring unit managing a CPU allocation and retrieval of the at least two partitions based on a number of currently available CPUs and a number of currently used CPUs is disclosed. The resource managing and monitoring unit monitors partition status information (the partition status information including the number of currently used CPUs, a number of guaranteed CPUs, a CAP status and a number of maximum available CPUs) for measuring a ratio of CPU usage about each of the at least two partitions.

6 Claims, 5 Drawing Sheets

FIG. 3

| Section | A partition | B partition | C partition | D partition |
|---|---|---|---|---|
| entitled capacity | 4 | 4 | 6 | 6 |
| capped status | uncapped | uncapped | capped | uncapped |
| max capacity | 10 | 10 | 10 | 10 |
| pc | 3 | 2 | 4 | 6 |

FIG. 4

| Section | A partition | B partition | C partition | D partition |
|---|---|---|---|---|
| entitled capacity | 4 | 4 | 6 | 6 |
| capped status | uncapped | uncapped | capped | uncapped |
| max capacity | 10 | 10 | 10 | 10 |
| pc | 3 | 2 | 4 | 6 |
| pcrate2 | 75% | 50% | 67% | 100% |
| pcrate3 | 30% | 20% | N/A | 60% |
| pcrate (available cpu number: 20-(3+2+4+6)=5)= | 3/min(5+3,10)= 38% | 2/min(5+2,10)= 29% | when capped, pcrate - EC - 67% | 6/min(5+6,10)= 60% |

FIG. 5

| Section | A partition | B partition | C partition | D partition |
|---|---|---|---|---|
| entitled capacity | 4 | 4 | 6 | 6 |
| capped status | uncapped | uncapped | capped | uncapped |
| max capacity | 10 | 10 | 10 | 10 |
| pc | 2 | 8 | 6 | 4 |
| pcrate2 | 50% | 100% | 100% | 67% |
| pcrate3 | 20% | 80% | N/A | 40% |
| pcrate (available cpu number: 20−(2+8+6+4)=0)= | 2/min(0+2,10)= 100% | 8/min(0+8,10)= 100% | when capped, pcrate = EC = 100% | 4/min(0+4,10)= 100% |

FIG. 6

| Section | A partition | B partition | C partition | D partition |
|---|---|---|---|---|
| entitled capacity | 4 | 4 | 6 | 6 |
| capped status | uncapped | uncapped | capped | uncapped |
| max capacity | 10 | 10 | 10 | 10 |
| pc | 5 | 8 | 2 | 5 |
| pcrate2 | 100% | 100% | 33% | 83% |
| pcrate3 | 50% | 80% | N/A | 50% |
| pcrate (available cpu number: 20−(5+8+2+5)=0)= | 5/min(0+5,10)= 100% | 8/min(0+8,10)= 100% | when capped, pcrate = EC = 33% | 5/min(0+5,10)= 100% |

US 8,713,171 B2

COMPUTER SERVER CAPABLE OF SUPPORTING CPU VIRTUALIZATION

CROSS-REFERENCE TO RELATED APPLICATIONS

This application is the United States National Phase under 35 U.S.C. §371 of PCT International Patent Application No. PCT/KR2010/007455, which designated the United States of America, having an International Filing date of Oct. 28, 2010, and claiming priority to Korean Application No. 10-2009-0103501, filed Oct. 29, 2009.

FIELD OF THE INVENTION

The described technology relates to a computer server, and more particularly to a computer server capable of supporting CPU (Central Processing Unit) virtualization.

BACKGROUND OF THE INVENTION

Recently, a computer server may perform various operating systems in a single hardware though CPU (Central Processing Unit) virtualization. A partition may be defined as a unit for independently performing operating systems. In CPU virtualization, an efficiency of the computer server may be decreased when a ratio of CPU usage is not accurately measured.

SUMMARY OF THE INVENTION

In some embodiments, a computer server includes a CPU (Central Processing Unit) pool including a plurality of CPUs, at least two partitions being exclusively offered the plurality of the CPUs and independently performing an operation system, and a resource managing and monitoring unit for managing a CPU allocation and retrieval of the at least two partitions based on a number of currently available CPUs and a number of currently used CPUs. The resource managing and monitoring unit monitors partition status information (the partition status information including the number of currently used CPUs, a number of guaranteed CPUs, a CAP status and a number of maximum available CPUs) for measuring a ratio of CPU usage about each of the at least two partitions.

In some embodiments, a computer server includes a CPU (Central Processing Unit) pool including a plurality of CPUs, a resource managing and monitoring unit configured to control the CPU pool to support CPU virtualization, and at least two partitions that independently operate wherein the at least two partitions request CPU allocation and retrieve an allocated CPU. The resource managing and monitoring unit monitors partition status information (the partition status information including the number of currently used CPUs, a number of guaranteed CPUs, a CAP status and a number of maximum available CPUs) about each of the at least two partitions.

In some embodiments, a computer server includes a CPU (Central Processing Unit) pool including a plurality of CPUs, a plurality of partitions, each being exclusively offered at least part of the plurality of the CPUs (hereinafter, referred to as a first CPU group), and retrieving at least part of the first CPU group (hereinafter, referred to as a second CPU group) or requesting additional allocation for at least available CPU of the plurality of the CPUs (hereinafter, referred to as a third CPU group)-, and a resource managing and monitoring unit that manages partition status information (the partition status information including the number of currently used CPUs, a number of guaranteed CPUs, a CAP status and a number of maximum available CPUs) for each of the plurality of the partitions, determines an approval of the additional allocation request based on a number of currently available CPUs and the partition status information when an additional allocation from a specific partition is requested, and monitors a ratio of CPU usage on each of each of the plurality of the partitions.

BRIEF DESCRIPTION OF THE DRAWINGS

FIG. 3 represents partition status information and the partition status information includes a number of currently used CPU (PC, Processor Consumed), a number of guaranteed CPU (EC, Entitled Capacity), a CAP status and a number of maximum available CPU (MC, Max Virtual CPUs).

FIG. 4 is a table illustrating procedure where the resource managing and monitoring unit in FIG. 1 calculates a PCRATE value based on the partition status table in FIG. 3.

FIG. 5 is a table illustrating procedure where the resource managing and monitoring unit in FIG. 1 calculates the PCRATE value based on other partition status information.

FIG. 6 is a table illustrating procedure where the resource managing and monitoring unit in FIG. 1 calculates the PCRATE value based on still other partition status information.

DETAILED DESCRIPTION OF THE INVENTION

The technology is described more fully hereinafter with reference to the accompanying drawings, in which example embodiments of the technology are illustrated. The technology may, however, be embodied in many different forms and should not be construed as limited to the example embodiments set forth herein. Rather, these example embodiments are provided to fully enable those of ordinary skill in the art to embody and practice the technology.

Terms used herein are to be understood as described below.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element.

The term "and/or" includes any and all combinations of one or more of the associated listed items. For example, "a first item, a second item and/or a third item" denotes at least one of the first item, the second item and the third item, that is, all the combinations of the first, second and third items including the first item, the second item and the third item each.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements, e.g., "between" versus "directly between" and "adjacent" versus "directly adjacent", should be interpreted in a like fashion.

As used herein, the singular forms "a", "an" and "the" are intended to include the plural forms as well, unless the context clearly indicates otherwise. It will be further understood that the terms "comprises", "comprising", "includes" and/or "including" when used herein, specify the presence of stated features, integers, steps, operations, elements and/or components, but do not preclude the presence or addition of one or more other features, integers, steps, operations, elements, components and/or groups thereof.

Respective steps described herein may be performed in a different order than that which is explicitly described. In other words, the respective steps may be performed in the same order as described, simultaneously, or in a reverse order.

Unless defined otherwise, all terms used herein have the same meaning as commonly understood by those of skill in the art. Such terms as those defined in a generally used dictionary are to be interpreted to have the meanings equal to the contextual meanings in the relevant field of art, and are not to be interpreted to have ideal or excessively formal meanings unless clearly defined in the present specification.

Figure 1:
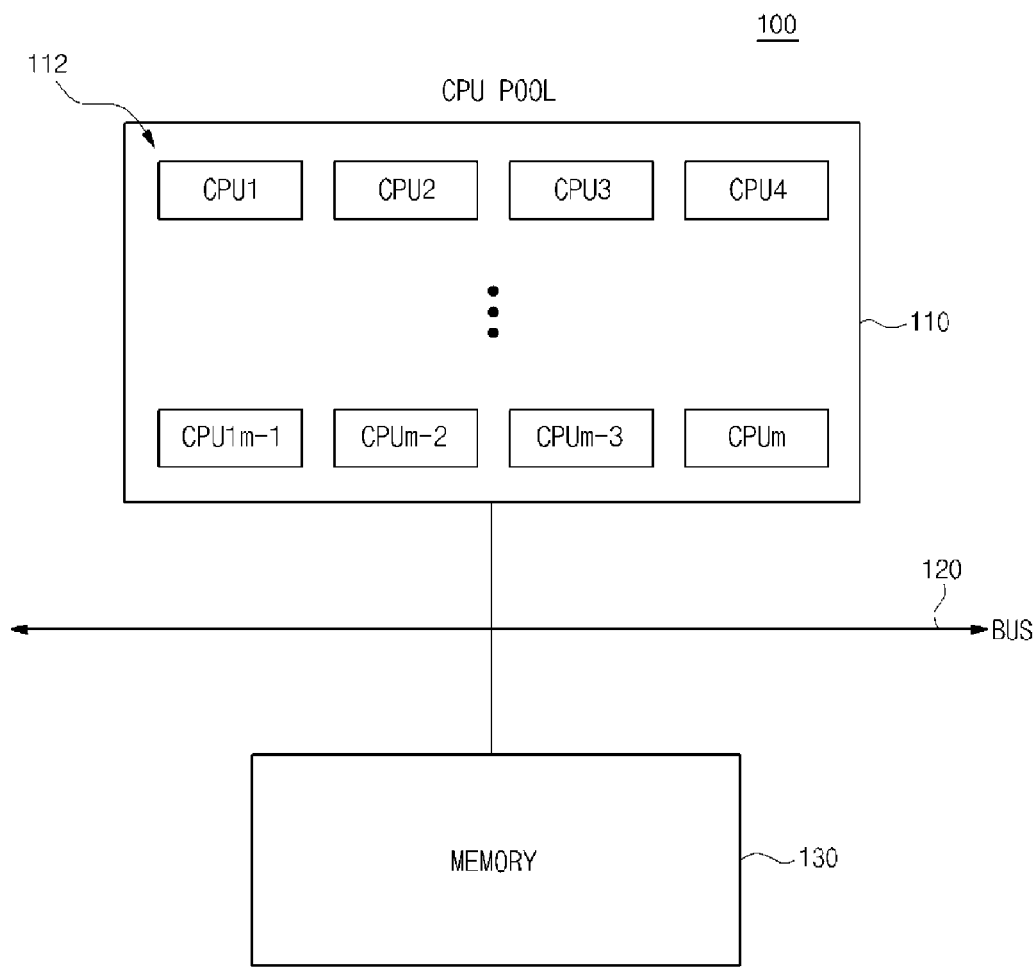
FIG. 1 is a diagram for illustrating a physical configuration of a computer server supporting CPU virtualization according to an example embodiment of the described technology.

FIG. 1 is a diagram for illustrating a physical configuration of a computer server supporting CPU virtualization according to an example embodiment of the described technology.

Referring to FIG. 1, a computer server 100 includes a CPU pool 110, a bus 120 and a memory 130.

The CPU pool 110 includes a plurality of CPUs 112. In one embodiment, the CPU pool 110 may be implemented as a separate PCB (Printed Circuit Board) and be connected with the bus 120. The bus 120 is an interface for physically connecting the CPU pool 110 and the memory 130. In one embodiment, the bus 120 may be implemented as PCI (Peripheral Component Interconnect) Express. The memory 130 may be accessible by the CPU pool 110 and may be implemented as an independent memory or a shared memory.

Figure 2:
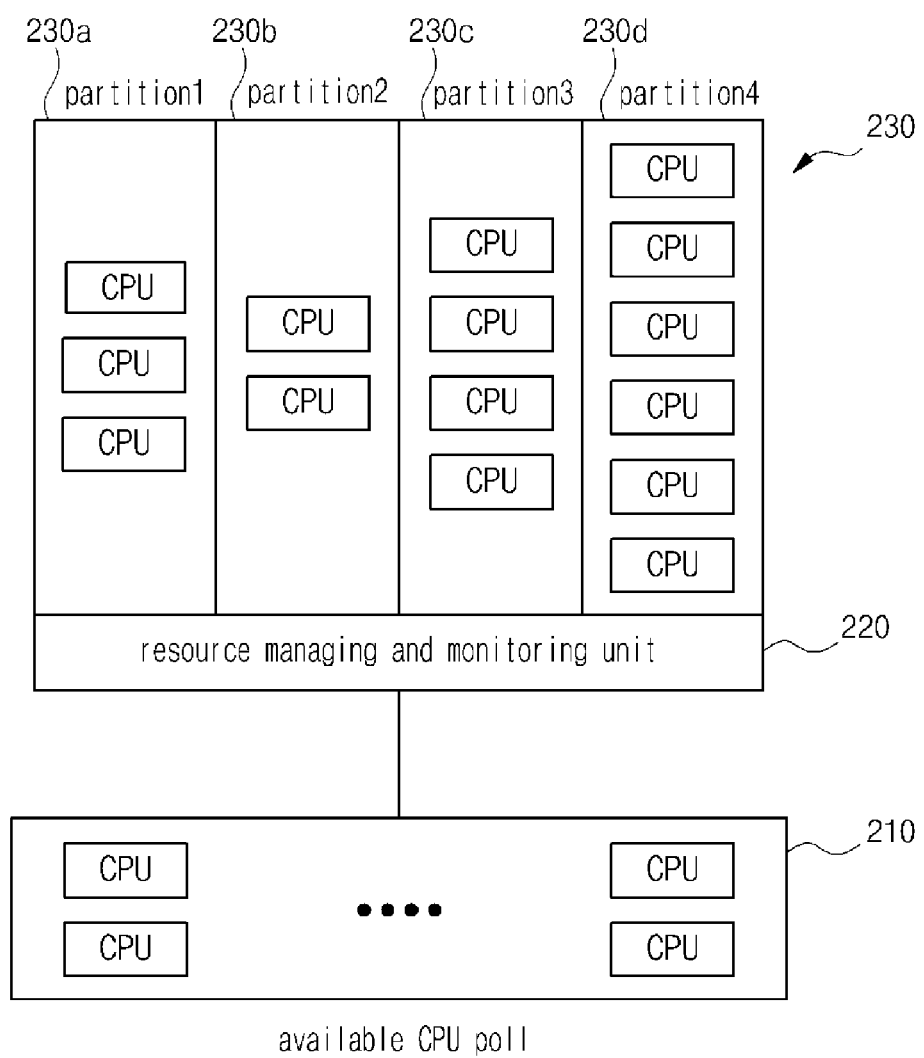
FIG. 2 is a diagram for illustrating a logical configuration of the computer server in FIG. 1.

FIG. 2 is a diagram for illustrating a logical configuration of the computer server in FIG. 1.

Referring to FIG. 2, the computer server 100 includes an available CPU pool 210, a resource managing and monitoring unit 220 and at least two partitions 230.

The available CPU pool 210 corresponds to a set of CPU that is included in the CPU pool 110 and is not occupied by the at least two partitions 230. For example, when the number of CPU in the CPU pool corresponds to a value of 20 and the number of CPU used by each of the partitions 230a~230d respectively corresponds to a value of 3, 2, 4 and 6, the number of CPU in the available CPU pool 210 corresponds to a value of 5.

The resource managing and monitoring unit 220 manages the available CPU pool 210, independently executes an operating system and exclusively uses CPU in the CPU pool 110. For example, if a CPU1 112 is allocated to a first partition 230a, then the CPU1 112 may not be allocated to other partitions 230b~230d. Operating systems of the first and second partitions 230a and 230b may not be the same.

Each of the at least two partitions 230 is exclusively offered at least part of a plurality of CPUs in the CPU pool 110 (hereinafter, referred to as a first CPU group) and performs a specific task. During performing the specific task, each of the at least two partitions 230 may retrieve at least part of the first CPU group (hereinafter, referred to as a second CPU group) or request additional allocation for at least available CPU of the plurality of the CPUs (hereinafter, referred to as a third CPU group).

For managing the available CPU pool 210, the resource managing and monitoring unit 220 determines an approval of additional allocation request when an additional allocation from a specific partition (e.g., the first partition 230a) is requested. The resource managing and monitoring unit 220 manages partition status information for each of the at least two partitions 230 and the partition status information includes a number of currently used CPU, a number of guaranteed CPU, a CAP status and a number of maximum available CPU. A ratio of CPU usage on each of the at least two partitions 230 is calculated as the following equation.

$$PCRATE=(PC/\min(APP+PC,MC))*100$$

PC is defined as a number of currently used CPU in a corresponding partition

APP is defined as a number of available CPU in the CPU pool

MC is defined as a maximum number of CPU that may be requested by the corresponding partition, when the CAP status corresponds to an UNCAPPED status (i.e., status capable of requesting CPU more than the number of guaranteed CPU).

When the CAP status corresponds to a CAPPED status (i.e., status incapable of requesting CPU more than the number of guaranteed CPU), the PCRATE value is calculated as the number of currently used CPU divided by the number of guaranteed CPU. Hereinafter, with references with FIGS. 3 through 6, an operation of the resource managing and monitoring unit 220 will be described.

FIGS. 3 through 6 are tables for illustrating partition status information managed by the resource managing and monitoring unit in FIG. 2.

FIG. 3 represents partition status information and the partition status information includes a number of currently used CPU (PC, Processor Consumed), a number of guaranteed CPU (EC, Entitled Capacity), a CAP status and a number of maximum available CPU (MC, Max Virtual CPUs).

In the first partition 230a of FIG. 3, the number of guaranteed CPU corresponds to a value of 4, the number of currently used CPU corresponds to a value of 3, the number of maximum available CPU corresponds to a value of 10, and the CAP status corresponds to an uncapped status (i.e., status capable of requesting CPU more than the number of guaranteed CPU).

In the second partition 230b of FIG. 3, the number of guaranteed CPU corresponds to a value of 4, the number of currently used CPU corresponds to a value of 2, the number of maximum available CPU corresponds to a value of 10, and the CAP status corresponds to an uncapped status (i.e., status capable of requesting CPU more than the number of guaranteed CPU).

In the third partition 230c of FIG. 3, the number of guaranteed CPU corresponds to a value of 6, the number of currently used CPU corresponds to a value of 4, the number of maximum available CPU corresponds to a value of 10, and the CAP status corresponds to a capped status (i.e., status incapable of requesting CPU more than the number of guaranteed CPU).

In the fourth partition 230d of FIG. 3, the number of guaranteed CPU corresponds to a value of 6, the number of currently used CPU corresponds to a value of 6, the number of maximum available CPU corresponds to a value of 10, and the CAP status corresponds to an uncapped status (i.e., status capable of requesting CPU more than the number of guaranteed CPU).

FIG. 4 is a table illustrating procedure where the resource managing and monitoring unit in FIG. 1 calculates a PCRATE value based on the partition status table in FIG. 3.

Because APP (i.e., the number of available CPU) corresponds to a value of 5, the PCRATE value of the partitions 230 respectively corresponds to 38%, 29%, 67% and 60% as illustrated in the above Equation. Also, because the number of available CPU corresponds to a value of 5, each of the partitions 230 may request additional CPU allocation.

Meanwhile, the resource managing and monitoring unit 220 may measure the ratio of CPU usage in other way than using PCRATE. In another embodiment, the resource managing and monitoring unit 220 determine the ratio of CPU usage based on a PCRATE2 value. The PCRATE2 value can be determined based the number of currently used CPU (PC) divided by the number of guaranteed CPU (EC). When the number of currently used CPU (PC) is equal to or greater than the number of guaranteed CPU, the PCRATE2 value corresponds to 100%. In still another embodiment, the resource managing and monitoring unit 220 determine the ratio of CPU usage based on a PCRATE3 value. The PCRATE3 value can be determined based on the number of currently used CPU (PC) divided by the number of maximum available CPU (MC). In FIG. 4, using the PCRATE3 value, the resource managing and monitoring unit 220 determines that the third partition 230c is overloaded.

FIG. 5 is a table illustrating procedure where the resource managing and monitoring unit in FIG. 1 calculates the PCRATE value based on other partition status information.

In FIG. 5, in comparison with FIG. 3, the number of currently used CPU in each of the partitions 230 corresponds to a value of 2, 8, 6 and 4.

Because APP (i.e., the number of available CPU) corresponds to a value of 0, the PCRATE value of the partitions 230 respectively corresponds to 100%, 100%, 100% and 100% as illustrated in the above Equation. Also, because the number of available CPU corresponds to a value of 0, each of the partitions 230 may not request additional CPU allocation. This causes the resource managing and monitoring unit 220 to inform performance degradation of the computer server 100 to a manager. For example, the resource managing and monitoring unit 220 may inform performance degradation with SMS (Short Message Service), e-mail and automatic voice call.

Meanwhile, when the ratio of CPU usage is calculated by using the PCRATE2 value, the fourth partition 230d is determined as not being overloaded and when the ratio of CPU usage is calculated by using the PCRATE3 value, the first, second and fourth partitions 230a, 230b and 230d are determined as not being overloaded.

FIG. 6 is a table illustrating procedure where the resource managing and monitoring unit in FIG. 1 calculates the PCRATE value based on still other partition status information.

In FIG. 6, in comparison with FIG. 3, the number of currently used CPU in each of the partitions 230 corresponds to a value of 5, 8, 2 and 5.

Because APP (i.e., the number of available CPU) corresponds to a value of 0, the PCRATE value of the partitions 230 respectively corresponds to 100%, 100%, 33% and 100% as illustrated in the above Equation. Therefore, the third partition 230c may request additional CPU allocation and in this request, the resource managing and monitoring unit 220 may fetch a CPU currently used by other partition 230a, 230b or 230d.

Meanwhile, when the ratio of CPU usage is calculated by using the PCRATE2 value, the fourth partition 230d is determined as not being overloaded and when the ratio of CPU usage is calculated by using the PCRATE3 value, the first, second and fourth partitions 230a, 230b and 230d are determined as not being overloaded.

Figure 7:
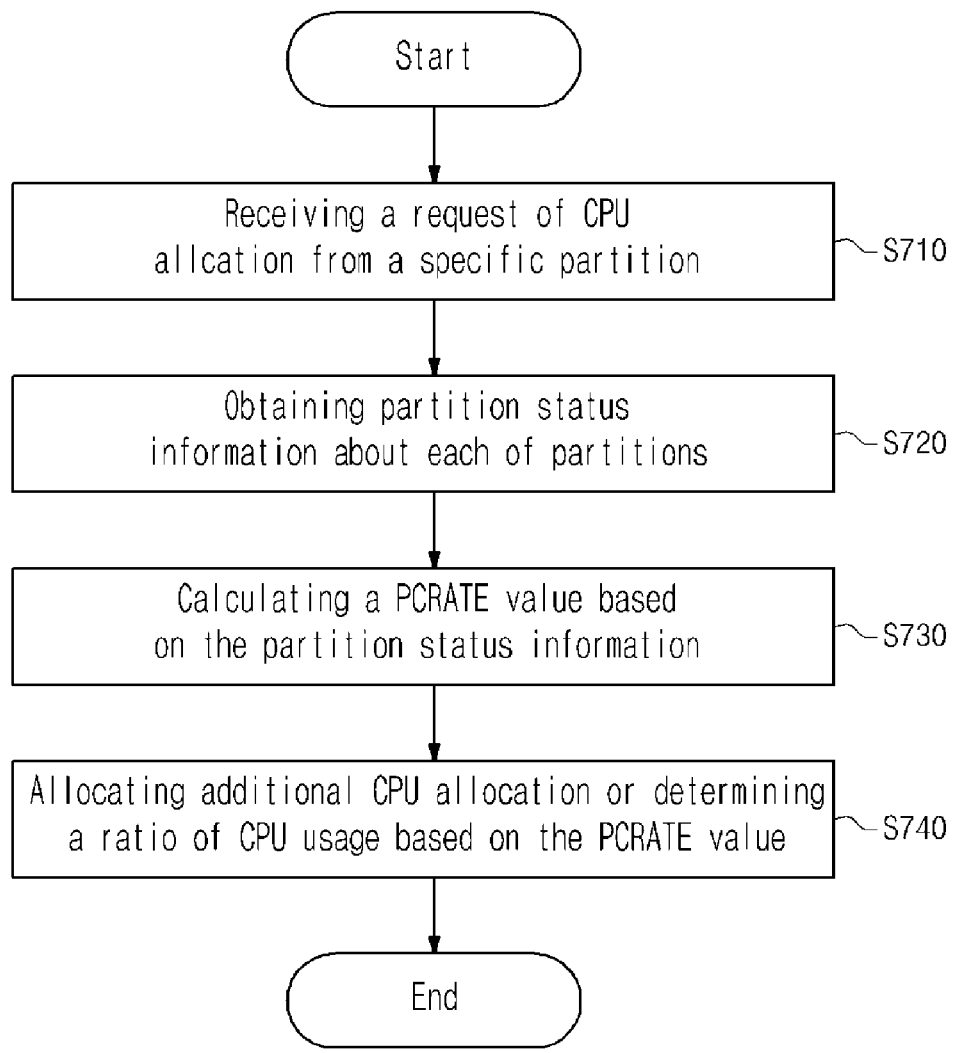
FIG. 7 is a flowchart for illustrating operating procedure of the resource managing and monitoring unit in FIG. 2.

FIG. 7 is a flowchart for illustrating operating procedure of the resource managing and monitoring unit in FIG. 2.

The resource managing and monitoring unit 220 may receive a request of CPU allocation from a specific partition 230a and obtain the partition status information about each of the partitions 230 (Steps S710 and S720). The partition status information includes the number of currently used CPU (PC, Processor Consumed), the number of guaranteed CPU (EC, Entitled Capacity), the CAP status and the number of maximum available CPU (MC, Max Virtual CPUs) as illustrated in FIG. 3.

The resource managing and monitoring unit 220 calculates the PCRATE value based on the partition status information (Step S730). In another embodiment, the resource managing and monitoring unit 220 calculates the PCRATE2 value or PCRATE3 value based on the partition status information.

The described technology has the following advantages. Because this does not mean that a specific example embodiment should include all the following advantages or only the following advantages, the scope of claim should not be limited to the following advantages.

A computer server according to an example embodiment may effectively measure a ratio of CPU usage based on partition status information to support CPU virtualization. That is, the computer server may help CPU resource distribution and system management by accurately measuring the ratio of CPU usage.

While the present invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims.

What is claimed is:

1. A computer server comprising:
a CPU (Central Processing Unit) pool including a plurality of CPUs;
at least two partitions that are exclusively offered the plurality of the CPUs and independently perform an operation system; and
a resource managing and monitoring unit that manages a CPU allocation and retrieval of the at least two partitions based on a number of currently available CPU and a number of currently used CPU, and that monitors partition status information for measuring a ratio of CPU usage about each of the at least two partitions, the partition status information including the number of currently used CPUs, a number of guaranteed CPUs, a CAP status and a number of maximum available CPUs,
wherein the resource managing and monitoring unit measures the ratio of CPU usage based on a PCRATE value calculated as follows:

$$PCRATE=(PC/\min(APP+PC,MC))*100, \text{ wherein}$$

PC is as a number of currently used CPUs in a corresponding partition,
APP is a number of available CPUs in the CPU pool, and
MC is a maximum number of CPUs that may be requested by the corresponding partition when the CAP status corresponds to an UNCAPPED status, the UNCAPPED status being a status capable of requesting CPUs more than the number of guaranteed CPU.

2. The computer server of claim 1, wherein the PCRATE value is calculated as the number of currently used CPUs divided by the number of guaranteed CPUs when the CAP status corresponds to a CAPPED status, the CAPPED status being a status incapable of requesting CPUs more than the number of guaranteed CPUs.

3. The computer server of claim 2, wherein the resource managing and monitoring unit informs performance degradation of the computer server to a system manager based on the PCRATE value.

4. A computer server comprising:
a CPU (Central Processing Unit) pool including a plurality of CPUs;
a resource managing and monitoring unit configured to control the CPU pool to support CPU virtualization; and
at least two partitions that independently operate, wherein the at least two partitions request CPU allocation and retrieve an allocated CPU;
wherein the resource managing and monitoring unit monitors partition status information about each of the at least two partitions, the partition status information including the number of currently used CPUs, a number of guaranteed CPUs, a CAP status and a number of maximum available CPUs,
wherein the resource managing and monitoring unit measures a ratio of CPU usage on the CPU virtualization based on a PCRATE value calculated as follows:

$PCRATE=(PC/\min(APP+PC,MC))*100$, wherein

PC is a number of currently used CPUs in a corresponding partition,
APP is a number of available CPUs in the CPU pool, and
MC is a maximum number of CPUs that may be requested by the corresponding partition when the CAP status corresponds to an UNCAPPED status, the UNCAPPED status being a status capable of requesting CPUs more than the number of guaranteed CPU.

5. A computer server comprising:
a CPU (Central Processing Unit) pool including a plurality of CPUs;
a plurality of partitions, each being exclusively offered at least part of the plurality of the CPUs comprising a first CPU group, and retrieving a second CPU group comprising at least part of the first CPU group, or requesting additional allocation for a third CPU group comprising at least an available CPU of the plurality of the CPUs;
a resource managing and monitoring unit that manages partition status information for each of the plurality of the partitions, determines an approval of the additional allocation request based on a number of currently available CPUs and the partition status information when an additional allocation from a specific partition is requested, and monitors a ratio of CPU usage on each of each of the plurality of the partitions wherein the partition status information includes the number of currently used CPUs, a number of guaranteed CPUs, a CAP status and a number of maximum available CPUs, and
wherein the resource managing and monitoring unit monitors a ratio of CPU usage on the specific partition based on a PCRATE value calculated as follows:

$PCRATE=(PC/\min(APP+PC,MC))*100$, wherein

PC is a number of currently used CPUs in a corresponding partition,
APP is a number of available CPUs in the CPU pool, and
MC is a maximum number of CPUs that may be requested by the corresponding partition when the CAP status corresponds to an UNCAPPED status, the UNCAPPED status being a status capable of requesting CPUs more than the number of guaranteed CPU.

6. The computer server of claim 5 wherein each of the plurality of the partitions executes a separate operating system and independently operates.

* * * * *